United States Patent [19]

Besselman, Jr.

[11] 4,139,138
[45] Feb. 13, 1979

[54] SOLDER TRAY

[76] Inventor: Charles W. Besselman, Jr., 13625 Halcourt, Norwalk, Calif. 90650

[21] Appl. No.: 785,369

[22] Filed: Apr. 7, 1977

[51] Int. Cl.² ........................... B25H 3/06; B25H 1/10
[52] U.S. Cl. ........................................ 228/57; 269/16; 362/154
[58] Field of Search ............... 269/16, 254 R, 254 CS, 269/254 D, 321 WE; 228/44.1 R, 57; 144/285; 240/2 D, 2 E, 2 MT, 6.4 F; 362/98, 99, 154–156

[56] References Cited

U.S. PATENT DOCUMENTS

| 607,187 | 7/1898 | Murray | 144/285 |
|---|---|---|---|
| 1,374,807 | 4/1921 | Beaty | 260/254 CS X |
| 2,120,571 | 6/1938 | Riechenstein et al. | 269/16 X |
| 2,203,474 | 6/1940 | Stenquist | 269/254 D X |
| 2,481,394 | 8/1949 | Cannava | 240/6.4 F |
| 2,517,914 | 8/1950 | Nowaczek | 240/6.4 F |
| 2,887,974 | 5/1959 | Weinfeld | 269/254 R X |
| 3,381,122 | 4/1968 | Boyle | 362/99 |

Primary Examiner—Al Lawrence Smith
Assistant Examiner—K. J. Ramsey
Attorney, Agent, or Firm—Edward E. Roberts

[57] ABSTRACT

There is shown and described an apparatus for utilization with soldering equipment or the like. The apparatus includes a tray having a plurality of compartments therein for storing various components and/or tools. A suitable light arrangement is provided wherein light can be applied to any portion of the tray. A suitable cover of appropriate strength and thermal resistivity is provided over the compartments for use as a work surface.

3 Claims, 4 Drawing Figures

4,139,138

SOLDER TRAY

Applicants device was registered under MPEP 1706 on Jan. 21, 1977 and assigned Disclosure Document No. 057108.

BACKGROUND

1. Field of the Invention

This invention is directed to an apparatus which is desirably utilizable as a soldering work station.

2. Prior Art

There are many known tools or types of apparatus which are used as work stations. Most of the known devices of this type are very complicated and are directed to highly specialized and highly technical operations. Many of these work stations, which are known in the art, incorporate mechanisms for working with micro-electronic devices or the like.

Typical of apparatus or devices known in the art are those devices shown in U.S. Pat. No. 3,705,680 to Siegel, entitled "Tool Holder"; U.S. Pat. No. 3,797,100 to Browne entitled "Soldering Method and Apparatus for Ceramic Circuits"; and the like.

SUMMARY OF THE INVENTION

This invention is directed to a relatively compact work station which is adapted specifically for soldering techniques. The apparatus includes a tray having a plurality of compartments for receiving tools and other pertinent implements. The compartments are covered by a suitable cover of appropriate strength and heat resistance. A pivotably mounted light is associated with the tray. This light may be stored out of the way or, when used, placed adjacent any desired location on the compartment cover. The apparatus can be battery operated and, thus, self contained if so desired.

BRIEF DESCRIPTION OF A PREFERRED EMBODIMENT

Figure 1:
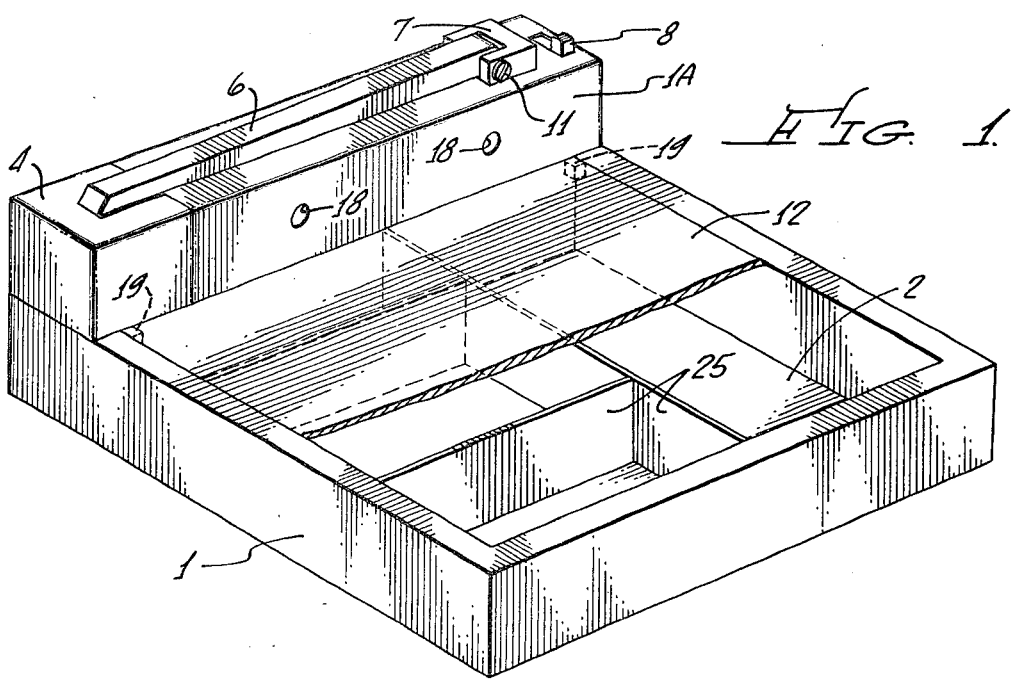
FIG. 1 is a perspective view of the apparatus which forms the subject of this invention.

Referring now to FIG. 1, there is shown a perspective view of the solder tray which forms the instant invention. The apparatus includes a basic tray which has an outer wall or frame 1. A bottom 2 is provided. A plurality of compartments are formed within frame 1, by compartment walls 25. Cover 12 (shown broken) is arranged to cover all (or as much as desired) of the compartments formed by walls 25. Typically, cover 12 will be sufficiently rigid to support any work activities thereon. In addition cover 12 will be of sufficient thermal resistance so that soldering operations can take place thereon without causing any injury to the cover. While cover 12 may be completely removable, it is typical to have the cover pivotably mounted by means of pivot 19 whereby access to compartments therebelow may be obtained.

At the end of frame 1, a further member 1A is provided. Member 1A may be formed integrally with frame 1, or, in the alternative, it may be separately provided. Member 1A includes appertures 18 therein, any number of which may be provided, for receiving device holders as described hereinafter. Member 1A can be a wall or compartmental area as desired.

A suitable light element 4 which may be in the order of a high intensity lamp or the like, is mounted on lamp arm 6. Lamp arm 6 is mounted at pivot 7 to member 1A. A suitable threaded member such as screw 11 controls the tension of pivot 7 and thus, the position of lamp 4. A suitable electrical switch 8 is provided to control the operation of lamp element 4.

Figure 2:
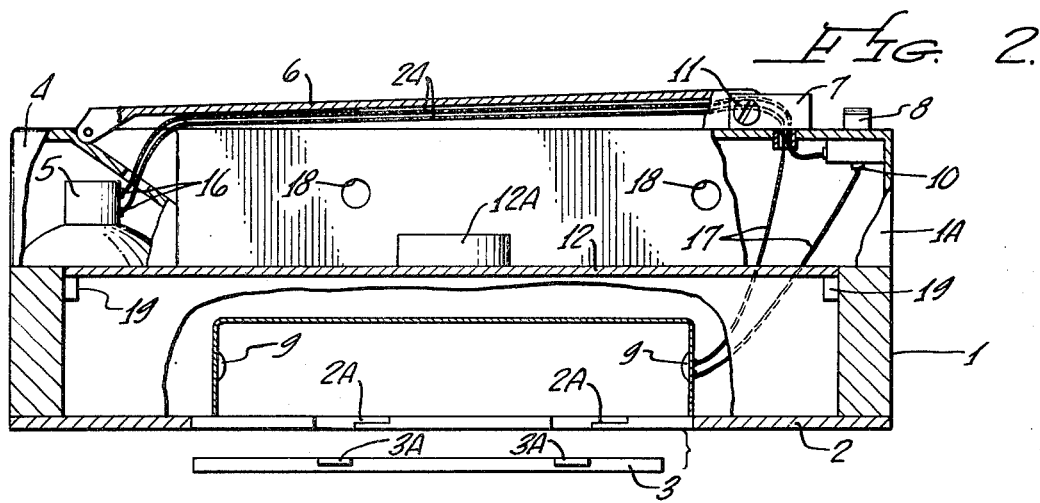
FIG. 2 is an end view, partially broken away, of the apparatus shown in FIG. 1.

Referring now to FIG. 2, there is shown an end view of the apparatus shown in FIG. 1 with portions thereof broken away to show internal structures. Frame 1 is shown in co-operation with bottom 2 and member 1A to provide the basic apparatus structure. Knob 12A as shown engaged with cover 12 provides means for lifting cover 12 mounted to pivots 19. Lamp element 4 is shown, partially broken away, to display lamp fixture 5 which has electrical contacts 16 associated therewith. Electrical contacts 16 are connected via wires 24 which pass through arm 6 and pivot 7 to switch 8. Switch 8 includes contacts 10 which are connected via wires 17 to battery contacts 9 which are formed in frame 1. Of course, a battery storage device can be provided in member 1A if so desired.

In embodiments shown in FIGS. 1 and 2, battery contacts 9 are included in a suitable battery housing in frame 1. The battery housing or compartment has a bottom 3 which includes tabs 3A which mate with receptacles 2A formed in a portion of bottom 2 wherein battery compartment 3 is retained. The battery compartment is located in frame 1 underneath member 1A.

Again, pivot 7 is controlled by tension knob 11 to control the position of lamp arm 6. Also, apertures 18 are provided in member 1A to aupport the apparatus or device holding mechanism shown in FIG. 4.

Figure 3:
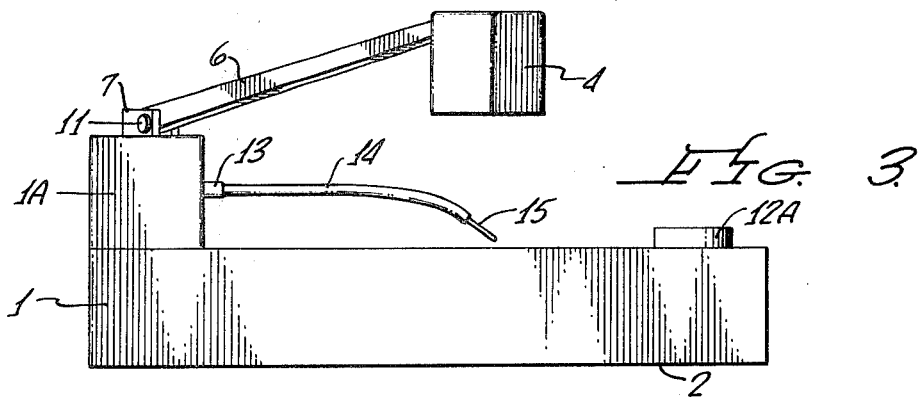
FIG. 3 is a side view of the apparatus shown in FIG. 1.

Referring now to FIG. 3, there is shown a side view of the apparatus shown in FIGS. 1 and 2. Again, frame 1 and bottom 2, along with member 1A form the basic apparatus structure. Lamp 4 is shown in a pivoted position such that light is thrown therefrom onto the work surface of cover 12. In FIG. 3 the apparatus shown in FIG. 4 is inserted into apertures 18 (not shown) in member 1A.

Figure 4:
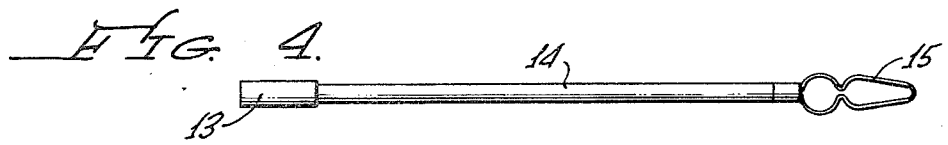
FIG. 4 is a schematic representation of the apparatus holding element used with the invention shown in FIG. 1.

Concurrently referring now to FIGS. 3 and 4, the device holding apparatus includes a fitting 13 which may be typically of plastic or the like which is insertable into apertures 18 in member 1A. Element 14 which is affixed to fitting 13 is a suitable flexible structure such as copper wire, plastic and the like. A suitable clip 15 arrangement, such as an alligator clip, is mounted at the other end of flexible member 14. By insetting a plurality of these devices into a plurality of apertures 18 in member 1A, a plurality of gripping functions can be provided clips 15 such that members being soldered can be firmly positioned relatively to the apparatus and, especially, light 4.

Thus there has been shown and described a compact work station apparatus. The apparatus is self-contained and includes compartments for storing tools and materials. A suitable work surface is provided, a selectively positionable light source is available relative to the work surface, and holding means are provided for positioning and holding the devices to be operated upon in a controlled manner. While those skilled in the art may conceive modifications to this invention, any such modifications which fall within the purview of this description are intended included herein as well. The scope of this application is not limited by this description. Rather the scope of the invention is limited only by the claims appended hereto.

Having thus described a preferred embodiment of the invention, what is claimed is:

1. A work station apparatus comprising:
 a first frame member including a tray-like base having an outer wall, a bottom member jointed to said outer wall, a plurality of partition divided sections defined in said frame member for storing various tools and elements to be utilized at said work station, and removable cover means, having heat resistance to soldering operations, for providing a work base for soldering operations, and for covering at least a portion of said sections;
 a second frame member mounted on top of and at one end of said first frame member including light source means pivotally mounted with respect to said second frame member whereby light can be applied to any portion of said cover means, a plurality of holding means for holding apparatus to be worked upon at said work station and;
 a plurality of apertures for receiving said holding means, said holding means including a fitting member insertable into said apertures, a flexible shape retaining member attached at one end to said fitting member, and clip means joined to the other end of said shape retaining member for controlling the position of said apparatus to be worked upon.

2. The work station recited in claim 1 wherein;
 said light source means comprises a lamp, a lamp arm pivotally attached at one end to said lamp and jointed to said second frame member by tension adjustable pivotal means for controlling the position of said lamp, and switch means for controlling electrical current to said lamp, said light source means folding to form an integral portion of said second frame member.

3. The work station recited in claim 2 including;
 compartment means for storing batteries for operating said light source means, said compartment having access means in said bottom member for replacing said batteries.

* * * * *